United States Patent [19]

Hurt, II et al.

[11] 4,082,343
[45] Apr. 4, 1978

[54] RESILIENTLY MOUNTED CAB-SIDEWALL RETAINER

[75] Inventors: William C. Hurt, II, Brimfield; Bruce W. Miers, Peoria Heights; Eugene O. Mossner, Washington, all of Ill.

[73] Assignee: Caterpillar Tractor Co., Peoria, Ill.

[21] Appl. No.: 650,528

[22] Filed: Jan. 19, 1976

Related U.S. Application Data

[63] Continuation of Ser. No. 563,777, Mar. 31, 1975, abandoned, which is a continuation of Ser. No. 435,754, Jan. 23, 1974, abandoned.

[51] Int. Cl.² .............................................. B62D 27/04
[52] U.S. Cl. .............................. 296/28 C; 180/89.12; 296/35 R
[58] Field of Search ..................... 296/28 C, 102, 103, 296/35 R; 280/756; 180/89.12, 89.13, 89.14, 89.15; 52/403

[56] References Cited

U.S. PATENT DOCUMENTS

| | | | |
|---|---|---|---|
| 1,811,923 | 6/1931 | Flintermann | 296/35 R |
| 2,073,617 | 3/1937 | Armington | 296/35 R |
| 2,367,826 | 1/1945 | Kubaugh | 296/35 R |
| 3,036,858 | 5/1962 | Fingerut | 280/756 |
| 3,105,717 | 10/1963 | Schilberg | 296/35 R |
| 3,177,032 | 4/1965 | Jaskowiak | 296/35 R |
| 3,560,019 | 2/1971 | Moore | 296/102 |
| 3,572,819 | 3/1971 | Moore | 296/102 |

Primary Examiner—Joseph F. Peters, Jr.
Assistant Examiner—John A. Carroll
Attorney, Agent, or Firm—Wegner, Stellman, McCord, Wiles & Wood

[57] ABSTRACT

An improved rollover operator protection structure and cab for a tractor. The tractor includes an operator platform about and over which is a rollover operator protection structure and a cab is supported to enclose the platform at its upper end by the rollover operator protection structure. The lower end of the cab is sealed against the platform and secured thereto by resilient strips and clamps.

8 Claims, 7 Drawing Figures

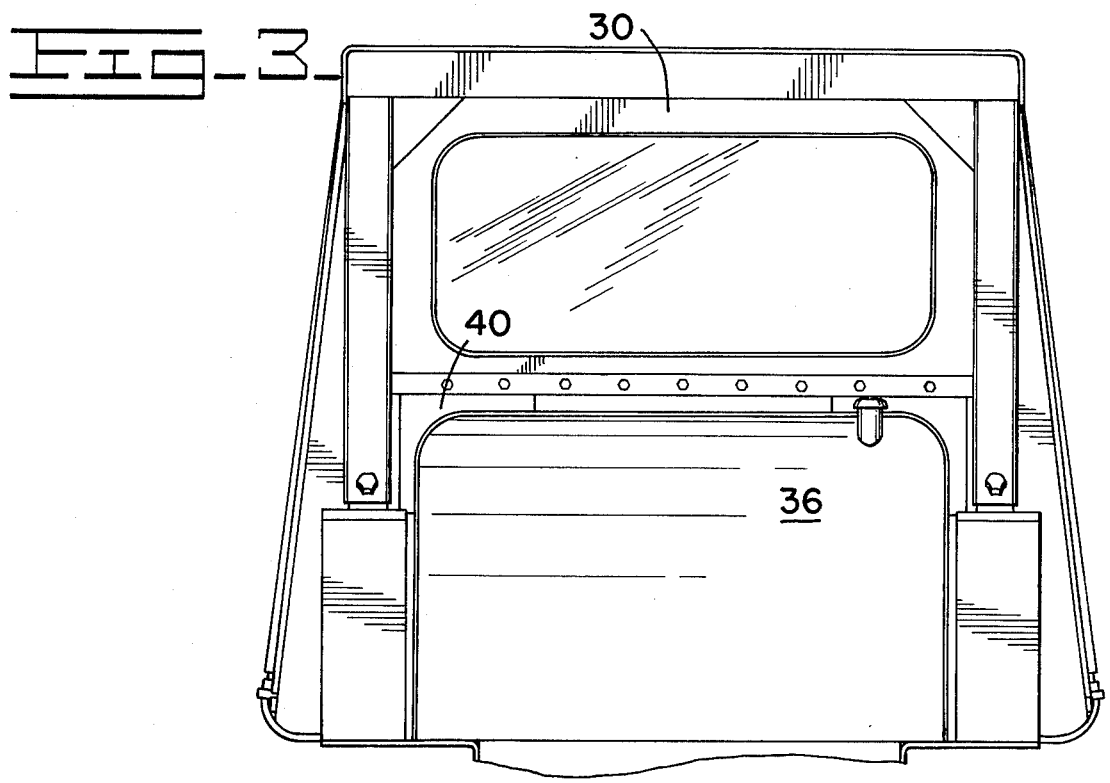
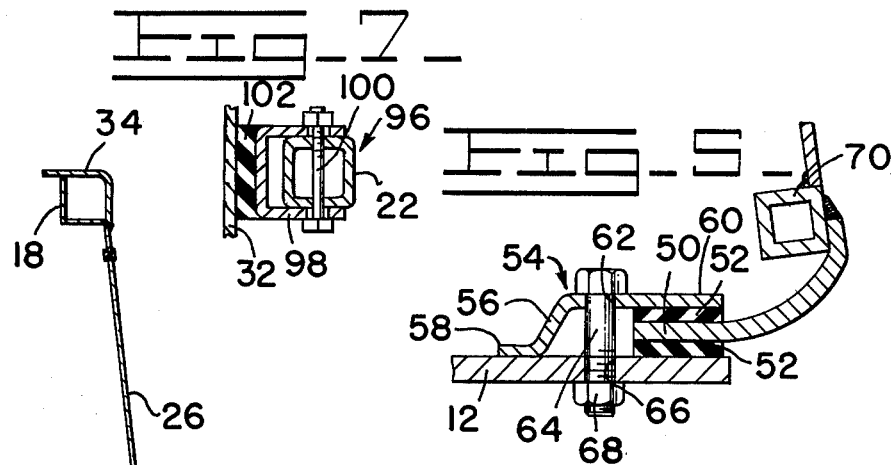
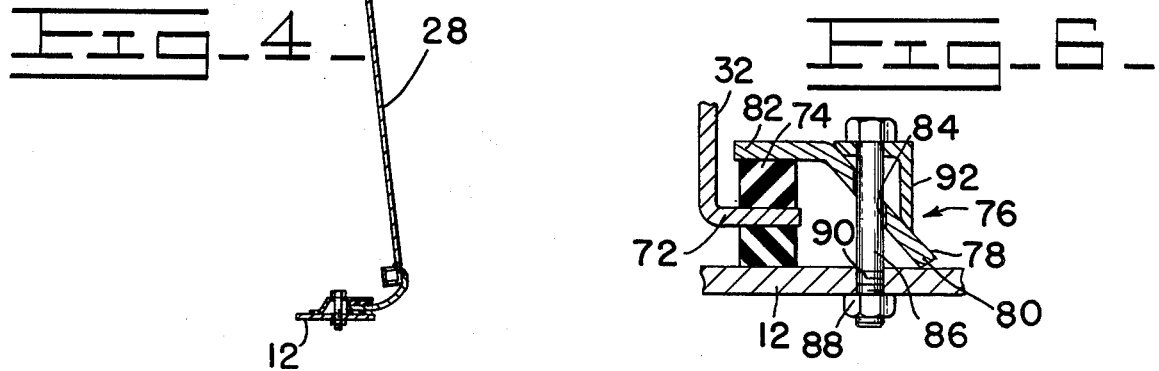

RESILIENTLY MOUNTED CAB-SIDEWALL RETAINER

This is a continuation of application Ser. No. 563,777, now abandoned, filed Mar. 31, 1975, which, in turn, is a continuation of application Ser. No. 435,754, filed Jan. 23, 1974.

BACKGROUND OF THE INVENTION

This invention relates to cabs for tractors and, more particularly, to such cabs which are to close an operator platform and are mounted on a rollover operator protection structure. Representative prior art includes Babbit U.S. Pat. No. 3,632,134 and Moore U.S. Pat. Nos. 3,572,819 and 3,623,754.

The desire to protect the operator of tractors working in rugged environments from both noise and injury due to the overturning of the tractor has resulted in the extensive use of rollover operator protection structures enclosing cabs for the operator platform on the tractor. Typically, the cab will be formed of sheet metal material and secured at its upper end to upper portions of the rollover operator protection structure. In one construction such as that shown in Moore U.S. Pat. No. 3,572,819, the lower end of the cab sealingly cooperates with the operator platform by means of wiper-like seals depending from the lower edges of the side walls of the cabs and engaging the upper surface of the operator platform.

The rollover operator protection structure, of course, prevents injury to the operator in the event the tractor overturns while sealing means results in the cab being sealed from the exterior against noise generated by the tractor motor. The lack of securing means securing the lower end of the cab to the operator platform minimizes the transmission of vibration to the interior of the cab.

However, when the tractor is operating in rugged terrain, the side walls of the cab tend to shift fore and aft and side to side relative to the operator platform with the result that the seal will not be universally maintained, the sealing elements are subject to excessive wear; and when the shifting is excessively severe, the usual means by which the upper end of the cab is secured to the rollover operator protection structure, frequently welds, become overstressed and fail.

On the other hand, where the cab side walls are connected directly to the platform, the noise level within the cab is frequently increased due to resonant vibration of the fixed but relatively flexible sheet metal walls of the cab. Moreover, such cabs tend to provide assembly problems on assembly lines in that the various components, by reason of their being firmly fixed to each other and to the tractor structure, must be made with more precise tolerances than is required in the manufacturing of cabs according to the above identified Moore patent.

SUMMARY OF THE INVENTION

It is the principal object of the invention to provide a new and improved rollover operator protection structure and suspended cab for tractors. More specifically, it is an object of the invention to provide such a device wherein stressing problems, assembly line problems, noise transmission problems, etc., are minimized or eliminated.

The exemplary embodiment of the invention achieves the foregoing object in a structure including a rollover operator protection structure which may take on any of a variety of forms but normally will include a pair of generally horizontally arranged members above an operator platform which are supported in such a position by at least two generally vertically arranged posts. A sheet metal cab is suspended from the horizontal members over the platform to enclose the same. The lower edges of the cab are resiliently secured to the platform, the resilient securing means so used providing sealing and noise isolation while relatively firmly affixing the lower end of the cab to the platform so as to preclude substantial shifting in rough terrain that would overstress the means by which the upper end of the cab is secured to the rollover operator protection structure or cause windows to crack or break.

In a preferred embodiment, the lower edge of the cab walls includes a generally horizontally directed edge which is approximately parallel to the operator platform. A pair of resilient strips sandwich the edge and, in turn, a clamp secured to the operator platform is employed to compress the strips against the edge to frictionally, yet resiliently, secure the lower ends of the cab side walls to the operator platform.

A further feature of the invention includes resilient snubber means which are interposed between one of the walls of the cab and the vertical posts of the rollover operator protection structure at the front of the operator platform so as to preclude shifting of the cab in high stress conditions as, for example, when the tractor engages a tree stump or large rocks when operating in rough terrain.

Other objects and advantages will become apparent from the following specification taken in conjunction with the accompanying drawings.

DESCRIPTION OF THE DRAWINGS

FIG. 3 is a rear elevation of the cab;

FIG. 4 is a vertical section taken approximately along the line 4—4 of FIG. 1;

FIG. 5 is an enlarged, fragmentary vertical section illustrating the lower structure seen in FIG. 4;

FIG. 6 is a vertical section taken approximately along the line 6—6 of FIG. 2; and FIG. 7 is a horizontal section taken approximately along the line 7—7 of FIG. 1.

DESCRIPTION OF THE PREFERRED EMBODIMENT

Figure 1:
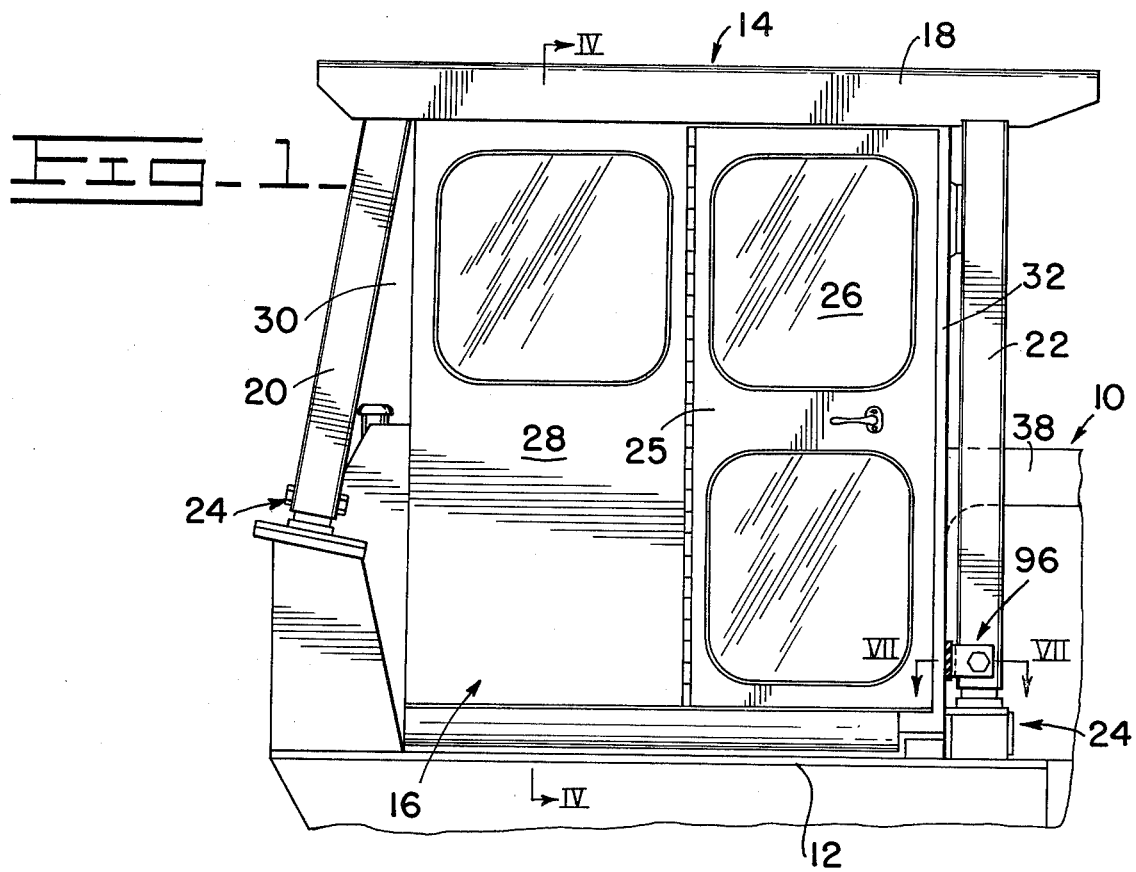
FIG. 1 is a side elevation of a cab made according to the invention.

An exemplary embodiment of the invention is illustrated in the drawings and, with specific reference to FIG. 1, is illustrated on a tractor, generally designated 10, which is only fragmentarily shown and which includes operator platform 12. Extending about and over the platform is a rollover operator protection structure, generally designated 14, from which a sheet metal cab, generally designated 16, is suspended to enclose the platform 12.

While the rollover operator protection structure 14 can take any of a variety of forms, it will customarily include elevated, generally horizontally extending, structural members 18 supported above the platform 12 by means of generally vertically extending posts 20 and 22. The posts 20 and 22, in turn, are typically secured by resilient securing means, generally designated 24, to any suitable portion of the operator platform 12 or the tractor 10.

The cab 16 will typically include one or more doors 25 formed of sheet metal or the like and having windows 26. In addition to the door 25, the cab 16 includes opposed side walls 28 (only one of which is shown), a rear wall 30 and a front wall 32, all of which are typically formed of sheet metal and include one or more of the windows 26. A roof 34 (FIG. 2) is also provided.

Figure 2:
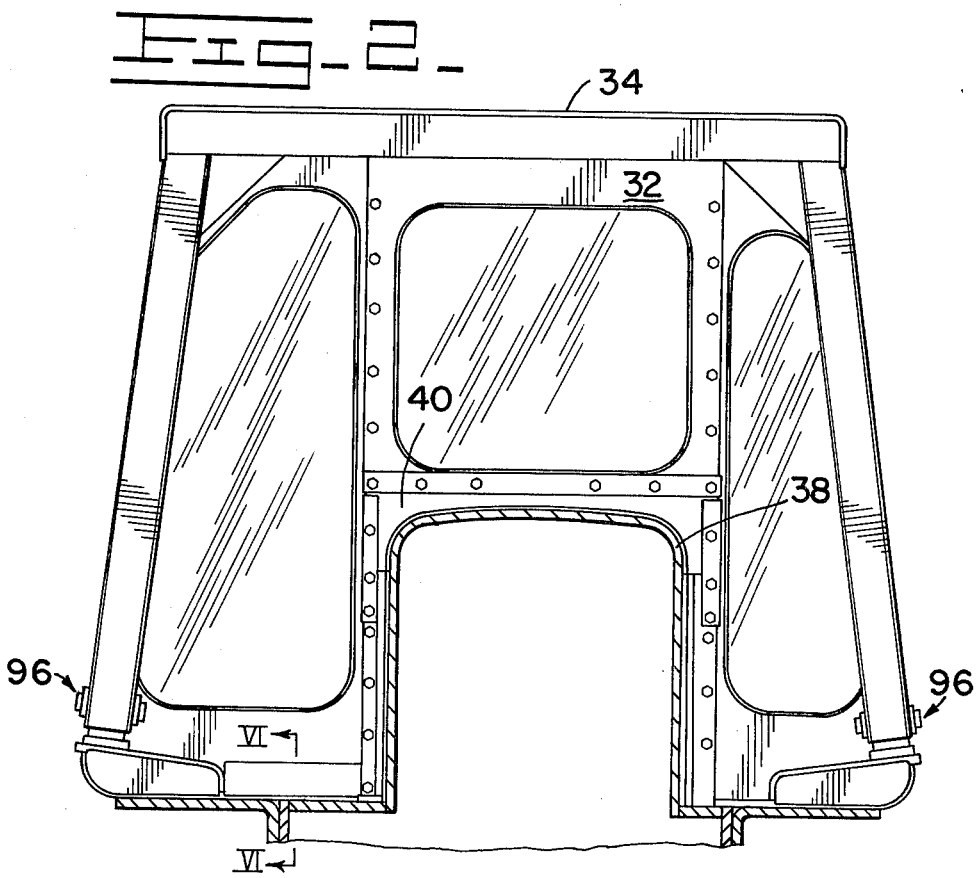
FIG. 2 is a front elevation of the cab with parts of the tractor shown in section.

As can be seen from FIGS. 2 and 3, in the case of the rear and front walls 30 and 32, the cab 16 does not extend completely downwardly to the operator platform 12 by reason of the presence of, for example, a gas tank 36 and the hood 38 of the tractor 10. At such points, a pliable material 40 is secured by any suitable means to the sheet metal forming the associated cab wall to engage either the fuel tank 36 or the hood 38.

At all other locations, the lower ends of the sheet metal walls of the cab 16 are resiliently but firmly secured to the operator platform 12.

Returning now to FIGS. 4 and 5, the manner by which the lower end of the side walls 28 are resiliently but positively secured to the operator platform 12 will now be described. Secured, as by welding, to the lower extremity of each side wall 28, is an elongated strip of metallic material terminating in an inwardly directed edge 50 which is spaced above the platform 12 and generally parallel thereto. The edge 50 is received between, in sandwiched relation, two elongated strips 52 of resilient material such as rubber. Of course, other materials can be used but it is highly desirable that they exhibit a high coefficient of friction.

The strips 52 are, in turn, compressed the edge 50 by a clamp, generally designated 54, which is defined by a formed, elongated strip 56 having a downturned edge 58 which engages the platform 12 and an opposite edge 60 for engaging the uppermost one of the strips 52. Intermediate the edges is a series of apertures 62 (only one of which is shown) through which a bolt 64 may extend to pass through an aligned aperture 66 in the operator platform 12 to receive a nut 68. By tightening the nut 68, any desired compression of the strips 52 may be achieved.

If desired, the edge 50 may be formed integrally with the lower end of the cab wall 28 but, in any event, the same provides the advantage of stiffening the same, acting as a stiffening rib as well as a portion of the securing means. Optionally, a separate tube-like stiffening rib 70 may be employed.

It should also be observed that the strips 52 need not be separate but could be formed to have a U-shaped cross section with the bight of the same being adjacent the bolt 64. Accordingly, reference herein, and in the claims appended hereto, to strips is intended to encompass such a unitary structure.

In the case of the front wall 32 of the cab, the same may include a forwardly directed edge 72 which also will be parallel to the operator platform 12. The edge 72, like the edge 50, is received between resilient strips 74 which are compressed by a clamp generally designated 76. The clamp 76 is defined by an elongated formed strip having one edge 80 adapted to engage the platform 12 and another edge 82 adapted to engage the upper one of the strips 74. Against, and intermediate the edges 80 and 82 is a series of apertures 84 (only one of which is shown) for receiving a bolt 86 and nut 88 in connection with an aligned aperture 90 in the operator platform 12. Because of the angular nature of the formed strips 78 employed in the clamp 76, the same may include an additional element in the form of an angle iron 92 so that the compressive force exerted by the bolt 86 against the form strip 78 will be uniformly applied to the latter.

FIGS. 1 and 7 illustrate snubber means, generally designated 96, which are interposed between the front wall 32 of the cab 16 and the vertical post 22 of the rollover operator protection structure 14 for the purpose of precluding appreciable shifting of the cab 16 when the tractor undergoes an abrupt jolt as, for example, when the same strikes a large tree stump or rock. With reference specifically to FIG. 7, a U-shaped yoke 98 is secured as by a bolt and nut 100 to each of the posts 22 near their lower end as best seen in FIG. 1. Returning to FIG. 7, the bight of the U-shaped yoke 98 has secured thereto, a thick resilient pad 102 which abuts the front wall 32 of the cab 16. Thus, upon an abrupt jolt, the front wall 32 of the cab cannot move appreciably forward allowing the side walls to shift. The use of the pad 102 nonetheless maintains vibration isolation.

From the foregoing, it will be appreciated that a cab made according to the invention is not subject to failures of securing means at its point of securement to the upper portion of a rollover operator protection structure by reason of the firm anchoring of its lower periphery. Moreover, the specific securing means whereby the lower periphery of the cab is secured to the operator platform to provide sealing for noise isolation, etc. It will also be recognized that the particular means disclosed for securing the lower periphery of the cab to the platform are ideally suited for assembly line techniques in that precise tolerances are not required, deviations from a desired shape being readily accommodated by a corresponding deformation of the strips 52 or 74 when compressed.

We claim:

1. In a tractor including an operator platform, a rollover operator protection structure about and over said platform, a cab formed of a material such as sheet metal enclosing said platform and secured at its upper end to said rollover operator protection structure to be supported thereby and elongated resilient means at least partially about the lower periphery of the cab sealingly engaging at least a corresponding portion of said platform, the improvement wherein said resilient means is resiliently secured along its length to both said platform and said cab lower periphery whereby the lower portion of the cab cannot appreciably shift relative to the upper portion of the cab while maintaining a seal between the cab interior and exterior to preclude the entry of environmental material into said cab and minimize noise and vibration within said cab.

2. The tractor of claim 1 wherein one member of said cab lower periphery and said platform includes an edge directed generally parallel to the other member of said cab lower periphery and said platform; and said resilient means comprises elongated strips of resilient material sandwiching said edge, and elongated clamp means on the other member of said cab lower periphery and said platform for compressing said strips against said edge.

3. The tractor of claim 1 wherein said resilient means comprise elongated resilient strips sandwiching an edge of one member of said cab lower periphery and elongated said platform, and clamp means on the other member of said cab lower periphery and said platform for compressing said strips against said edge.

4. The tractor of claim 1 wherein said cab lower periphery is provided with a generally horizontally extending edge generally parallel to said platform and spaced therefrom and said resilient means comprises a first strip of resilient material interposed between and engaging said platform and said edge and a second strip of resilient material abutting said edge oppositely of said first strip, and elongated clamp means engaging said second strip oppositely of said edge and compressing said strips against said edge.

5. The tractor of claim 1 wherein said rollover operator protection structure includes two generally vertical front posts, and wherein the cab includes a front wall formed of sheet material and including the further improvement of resilient snubber means interposed and engaging said posts and a lower portion of the front wall of said cab.

6. In a tractor including an operator platform, a rollover operator protection structure about and over said platform, a cab formed of a material such as sheet metal enclosing said platform and secured at its upper end to said rollover operator protection structure to be supported thereby and resilient means at least partially about the lower periphery of the cab sealingly engaging at least a corresponding portion of said platform, the improvement wherein said resilient means is resiliently secured to both said platform and said cab lower periphery to allow minimal relative movement therebetween while preventing the lower portion of the cab from appreciably shifting relative to the platform and while maintaining a seal between the cab interior and exterior to preclude the entry of environmental material into said cab and minimize noise and vibration within said cab, said cab lower periphery being provided with a generally horizontally extending edge generally parallel to said platform and spaced therefrom, said resilient means comprising a first strip of resilient material interposed between and engaging said platform and said edge and a second strip of resilient material abutting said edge oppositely of said first strip and clamp means engaging the first strip opposite said edge and compressing said strips against said edge, said clamp means including an elongated strip of relatively rigid material, said strip having a resilient strip engaging portion, an opposite platform engaging portion and an intermediate securing portion; and means adjustably interconnecting said intermediate securing portion and said platform.

7. In a tractor including an operator platform, a rollover operator protection structure about and over said platform, a cab formed of a material such as sheet metal enclosing said platform and secured at its upper end to said rollover operator protection structure to be supported thereby and resilient means at least partially about the lower periphery of the cab sealingly engaging at least a corresponding portion of said platform, the improvement wherein said resilient means is resiliently secured to both said platform and said cab lower periphery to allow minimal relative movement therebetween while preventing the lower portion of the cab from appreciably shifting relative to the platform and while maintaining a seal between the cab interior and exterior to preclude the entry of environmental material into said cab and minimize noise and vibration within said cab, said cab lower periphery being provided with said resilient means comprising an elongated resilient strip means sandwiching an edge of one member of said cab lower periphery and said platform, and clamp means including an elongated, relatively rigid strip secured to and engaging the other member of said cab lower periphery and said platform and having a clamping edge in engagement with said resilient strip means for compressing said resilient strip means against said edge of said one member of said cab lower periphery and said platform; said rollover operator protection structure further including two generally vertical front posts, said cab including a front wall formed of sheet material; and further including resilient snubber means interposed between and engaging said posts and the lower portion of the front wall of said cab.

8. In a tractor including an operator platform, a rollover operator protection structure about and over said platform, a cab formed of a material such as sheet metal enclosing said platform and secured at its upper end to said rollover operator protection structure to be supported thereby and resilient means at least partially about the lower periphery of the cab sealingly engaging at least a corresponding portion of said platform, the improvement wherein said resilient means is resiliently secured to both said platform and said cab lower periphery to allow minimal relative movement therebetween while preventing the lower portion of the cab from appreciably shifting relative to the platform and while maintaining a seal between the cab interior and exterior to preclude the entry of environmental material into said cab and minimize noise and vibration within said cab, said cab lower periphery being provided with said resilient means comprising an elongated resilient strip sandwiching an edge of one member of said cab lower periphery and said platform, and clamp means including an elongated, relatively rigid strip secured to and engaging the other member of said cab lower periphery and said platform and having a clamping edge in engagement with said resilient strip means for compressing said resilient strip means against said edge of said one member of said cab lower periphery and said platform.

* * * * *

UNITED STATES PATENT AND TRADEMARK OFFICE
CERTIFICATE OF CORRECTION

PATENT NO. : 4,082,343
DATED : April 4, 1978
INVENTOR(S) : William C. Hurt, Bruce W. Miers, Eugene O. Mossner It is certified that error appears in the above-identified patent and that said Letters Patent are hereby corrected as shown below:

Column 4, lines 62 & 63, cancel the word "elongated";

Same column, line 63, after "and" insert --elongated--.

*Signed and Sealed this*

*Nineteenth* Day of *September 1978*

[SEAL]

Attest:

RUTH C. MASON
*Attesting Officer*

DONALD W. BANNER
*Commissioner of Patents and Trademarks*